Figure 1:
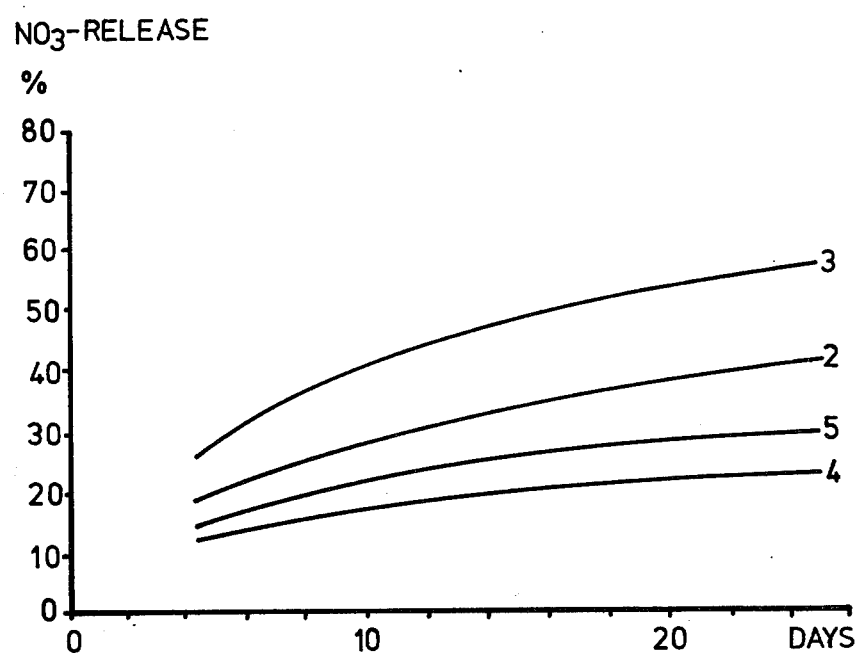

United States Patent [19]

Heller et al.

[11] Patent Number: 4,469,502

[45] Date of Patent: Sep. 4, 1984

[54] ION EXCHANGER FERTILIZERS AND A PROCESS FOR SUPPLYING PLANTS WITH NUTRIENTS UNIFORMLY AND OVER A LONG PERIOD OF TIME

[75] Inventors: Harold Heller; Dietmar Schäpel, both of Cologne, Fed. Rep. of Germany

[73] Assignee: Bayer Aktiengesellschaft, Leverkusen, Fed. Rep. of Germany

[21] Appl. No.: 492,511

[22] Filed: May 6, 1983

[30] Foreign Application Priority Data

May 26, 1982 [DE] Fed. Rep. of Germany ....... 3219659

[51] Int. Cl.$^3$ .................................................. C05G 1/00
[52] U.S. Cl. .................................. 71/11; 47/DIG. 4; 71/27; 71/64.07; 71/64.11
[58] Field of Search ............... 71/11, 27, 64.07, 64.11; 427/407.1; 47/DIG. 4, 48.5, 59, 62

[56] References Cited

U.S. PATENT DOCUMENTS 3,082,074 3/1963 Handley et al. ........................ 71/1
3,245,776 4/1966 Rubin ........................................ 71/1
3,264,089 8/1966 Hansen ............................... 71/64.11
4,015,970 4/1977 Hennart ................................... 71/11
4,396,412 8/1983 Heller et al. .............................. 71/27

Primary Examiner—G. L. Kaplan
Attorney, Agent, or Firm—Sprung, Horn Kramer & Woods

[57] ABSTRACT

A process for supplying plants with nutrients uniformly and over a long period of time by the addition of nutrient-charged synthetic resin ion exchangers and mineral fertilizers to the culture medium, according to which the nutrient-charged synthetic resin ion exchangers are employed together with those mineral fertilizers with particle size <500 μm which have been coated with massive polyurethanes having a particular water absorbing capacity which is adapted in a particular manner to the water solubility of the mineral fertilizer; furthermore, fertilizers containing nutrient-charged synthetic resin ion exchangers, and the mineral fertilizers coated with the massive polyurethanes having a particular water absorbing capacity.

13 Claims, 1 Drawing Figure

ION EXCHANGER FERTILIZERS AND A PROCESS FOR SUPPLYING PLANTS WITH NUTRIENTS UNIFORMLY AND OVER A LONG PERIOD OF TIME

The invention relates to a process for supplying plants with nutrients uniformly and over a long period of time by means of nutrient-charged synthetic resin ion exchangers, and mineral fertilisers embedded in polyurethanes. The invention furthermore relates to fertilisers comprising nutrient-charged synthetic resin ion exchangers and to mineral fertilisers embedded in polyurethanes.

Owing to their advantageous properties, nutrient-charged synthetic resin ion exchangers are extensively employed today, in particular for the care of ornamental plants in water cultures, as fertilisers with a long-term action. Substances which are particularly commonly used are those mixtures of cation and anion exchanger resins which with the exception of the divalent nutrient ions calcium, magnesium and sulphate contain all important macro- and micro-nutrients for plants. The divalent nutrient ions calcium, magnesium and sulphate are present in sufficient amounts in most of the customary irrigation waters, so that they do not need to be fed separately to the plants (see E. Hanselmann: Hydrokultur, Verlag Eugen Ulmer, Stuttgart, 1981, page 40 et seq.)

However, difficulties with these nutrient-charged synthetic resin ion exchangers occur when they are used together with soft irrigation waters, for example completely or partially softened irrigation waters or natural soft irrigation waters. These are based on the fact that in these soft waters the plants are no longer supplied with the required amounts of the stated divalent nutrient ions, in particular calcium ions, and/or that in these soft irrigation waters the uniform release of the nutrient ions from the ion exchanger fertiliser is no longer assured. As a result of the difficulties, symptoms of deficiency appear in the plants grown in these soft irrigation waters or using these soft irrigation waters. The symptoms of deficiency are noticeable in reduced growth, reduced readiness to flower, reduced harvest yield and specific symptoms of nutrient deficiency.

To overcome these difficulties, it has been recommended that small amounts of calcium sulphate be added continuously to the irrigation water, or a mixture of nutrient-charged ion exchangers with a large excess of a cation exchanger charged with calcium ions be employed (see E. J. Hewitt: Sand and Water Culture Method used in the study of plant nutrition, Commonwealth, Agricultural Bureaux, Technical Communication No. 22, 2nd edition, 1966, page 63 et seq.). The first method, however, necessitates an undesirable extra expense, in particular with regard to analytical monitoring of the composition of the nutrient solution, while the second method, as a result of the relatively high price of ion exchanger resins, makes the entire process uneconomical.

Furthermore, the use of mixtures of ion exchanger fertilisers and gypsum for generally improving plant growth in water cultures has been proposed (see German Offenlegungsschrift No. 2,819,871). This proposal is based on the assumption that the addition of a large amount of gypsum represents a suitable salt reserve which goes into solution only slowly and is therefore suitable for promoting, over a long period of time, the release of the nutrients from the ion exchangers, particularly when irrigation waters with a low salt content are used. However, this assumption is based on an error, since in the presence of ion exchangers even poorly soluble salts, such as gypsum, are rapidly dissolved (see F. Helfferich, Ion Exchange, McGraw-Hill Book Comp., New York, 1962, pages 226–229 and 295–299), and equivalent amounts of ions present on the ion exchanger go into solution. In the present case, these are the nutrient salt ions the ion exchanger fertilisers are charged with. That is to say, although the addition of gypsum eliminates the deficiency of divalent ions in the nutrient solution, slow release of the nutrients from the nutrient-charged ion exchangers is not achieved. Instead, the addition of gypsum effects a sudden strong increase in the nutrient concentration in the solution as a result of the rapid discharging of the ion exchangers, according to the amount of gypsum used. In the case of salt-sensitive plants, such as orchids, bromelias, azaleas and ferns, and young plants in general, this rapid release of the nutrient salts can lead to damage due to salinisation (see F. Penningsfeld et al. in Hydrokultur and Torfkultur (Water Culture and Peat Culture), pages 40–42, Ulmer Verlag, Stuttgart, 1966). With the mixtures which are proposed in German Offenlegungsschrift No. 3,020,422 for irrigation waters with a low salt content, and which consist of weakly basic and weakly acidic ion exchangers which are charged to a particularly high level with nutrient ions, it is likewise impossible to eliminate the deficiency of divalent nutrient ions in soft irrigation waters, since these mixtures, as a result of their selective binding power for divalent ions, in particular that of the weakly acidic cation exchangers for calcium and magnesium ions, effect a further reduction in the content of these ions in the irrigation waters which are in any case soft.

However, it has now been found that, in soft irrigation waters, the deficiency of divalent nutrient ions, in particular of calcium, magnesium and sulphate ions, can be eliminated, and at the same time uniform relese of the nutrient ions from the ion exchanger fertilisers can be achieved, when inorganic fertiliser salts (referred to as mineral fertilisers below) containing the stated divalent nutrient ions are coated with polyurethanes having a particular water-absorbing capacity, and the nutrient-charged synthetic resin ion exchangers are employed together with these mineral fertilisers coated with particular polyurethanes. As a result of coating the mineral fertilisers with the special polyurethanes, the rate at which they dissolve in the presence of ion exchangers is set in a particular manner.

It is known that mineral fertilisers can be coated with plastics in order to reduce the rate at which they dissolve and hence to prolong their duration of action. By choosing the coating substance and the type of coating process, attempts have been made to adapt the duration of action of the coated mineral fertilisers to their intended use. Coating has been effected by both encapsulation with the coating substances and embedding (dispersing) in the coating substances. However, the processes for the production of coated mineral fertilisers are technically complicated and expensive (see, for example, R. Powell: Controlled Release Fertilisers, Noyes Development Corporation, Parkridge N.J., 1968; R. A. Hendrie, Granulated Fertilisers, Noyes Data Corporation, Parkridge N. J., 1976). Thus, these coated mineral fertilisers, although they have some substantial advantages, have been used hitherto only to a limited extent in certain sectors of horticulture (see E. S. Sharma in Scientia Horticulturae 11 (1979), pages 107–129).

U.S. Pat. No. 3,373,009 describes, for example, foams which are suitable as plant growth media and consist of a water-insoluble polyurethane-based matrix material which is at least partially open-pored and in which, as plant nutrients, inorganic fertiliser salts of limited water solubility and anion exchangers charged with nitrate ions are embedded. Although these polyurethane foams containing plant nutrients are suitable as large pieces of inert materials for plant growth without soil, they are unsuitable as universally usable fertilisers, since the release of the nutrients from these polyurethane foams when they are used as fertilisers is hindered to an excessive extent by diffusion.

German Offenlegungsschrift No. 2,521,277 especially recommends covalently crosslinked polyurethane-/polyurea hydrogels generally for embedding plant nutrients and fertilisers. German Offenlegungsschrift No. 3,031,893 describes the use of these hydrogels for embedding nutrientcharged ion exchangers and, if appropriate, mineral fertilisers which are free or coated with a coating substance. However, it has been found that the problem of eliminating the deficiency of divalent nutrient ions and at the same time achieving uniform release of the nutrient ions from the ion exchanger when soft irrigation waters are used cannot be solved with these hydrogels containing ion exchanger fertilisers and, if appropriate, coated mineral fertilisers. On the one hand, the structural stability of the hydrogels is greatly reduced by free mineral fertilisers incorporated in the gel. This is particularly noticeable when they are used in water cultures. On the other hand, depending on whether they are more readily or less readily soluble, the mineral fertilisers diffuse either too rapidly or too slowly out of the hydrogel. Diffusion which is too slow leads to an excessive delay in the release of nutrients; on the other hand, diffusion which is too rapid has the following disadvantages: when used in the open, the bulk of the nutrients released are washed out into the subsoil and hence are lost; when used in the dam technique which is widely employed in water culture, slightly elevated salt concentrations occur in the nutrient solution, and these can lead to damage to the plants as a result of salinisation.

It has now been found that the object of eliminating the deficiency of divalent nutrient ions when soft irrigation waters are used and at the same time obtaining uniform release of the nutrient ions from the synthetic resin ion exchanger can be achieved by comminuting the mineral fertilisers to a particle size $<500$ μm, coating these comminuted mineral fertilisers, depending on their water solubility, with a polyurethane having a particular water-absorbing capacity, and adapting thereby the water-absorbing capacity of the polyurethane to the water solubility of the mineral fertiliser to be coated, in a manner such that the slightly soluble mineral fertilisers are coated with polyurethanes having a high water-absorbing capacity, and the readily soluble mineral fertilisers are coated with polyurethanes having a low water-absorbing capacity.

The invention therefore relates to a process for supplying plants with nutrients uniformly and over a long period of time by the addition of nutrient-charged synthetic resin ion exchangers and mineral fertilisers to the culture medium characterised in that the nutrient-charged synthetic resin ion exchangers are employed together with mineral fertilisers which have a particle size $<500$ μm, preferably $<100$ μm, particularly preferably $<50$ μm, and have been coated with massive polyurethanes having a particular water-absorbing capacity (WA) which is adapted to the water solubility (WS) of the mineral fertiliser in the following manner:

for mineral fertilisers of a WS (20° C.) $<3$ g/l polyurethanes of a WA 25–60 g of water/100 g of polyurethane are used;

for mineral fertilisers of a WS (20° C.) $>3$ g/l polyurethanes of a WA 0.5–30 g of water/100 g of polyurethane are used.

Preferably, the water solubility (WS) of the mineral fertiliser and the water absorbing capacity (WA) of the massive polyurethane to be used for coating the mineral fertiliser are matched in the following manner:

for mineral fertilisers of a WS (20° C.) $<3$ g/l polyurethanes of a WA 30–50 g of water/100 g of polyurethane are used;

for mineral fertilisers of a WS (20° C.) $>3$ g/l polyurethanes of a WA 0.5–20 g of water/100 g of polyurethane are used.

Particularly preferably, the water solubility (WS) of the mineral fertiliser and the water-absorbing capacity (WA) of the massive polyurethane to be used for coating the mineral fertiliser are matched in the following manner:

for mineral fertilisers of a WS (20° C.) $<3$ g/l polyurethanes of a WA 35–45 g of water/100 g of polyurethane are used; for mineral fertilisers of a WS (20° C.) $>3$ g/l polyurethanes of a WA 0.5–15 g of water/100 g of polyurethane are used.

the mineral fertilisers are coated with such an amount of massive polyurethane having a particular water-absorbing capacity that the weight ratio mineral fertilisers (anhydrous)/polyurethane is 1:9 to 1:0.25, preferably 1:6 to 1:1.5.

The nutrient-charged ion exchangers and the mineral fertilisers coated with the massive polyurethanes having a particular water-absorbing capacity adapted to the water solubility of the mineral fertilisers can be added to the culture media separately or in the form of preformed mixtures.

Nutrient-charged synthetic resin ion exchangers, and mineral fertilisers coated with the polyurethanes having a particular water-absorbing capacity, are employed in proportions such that the amount of mineral fertilisers is 25–300 equivalent %, preferably 75–150 equivalent %, relative to the sum of acidic and basic groups in the nutrient-charged ion exchangers. (Amount of mineral fertilisers in equivalents = sum of the cation equivalents (eq$^+$) and anion equivalents (eq$^-$) present in the mineral fertiliser).

The mixtures of nutrient-charged synthetic resin ion exchangers with mineral fertilisers coated with massive polyurethanes having a particular water-absorbing capacity can be produced by mechanical mixing of the bead-like (granulated) nutrient-charged ion exchangers with the coated mineral fertilisers which have been granulated to a comparable particle size. A special, particularly preferred embodiment of the mixtures according to the invention is obtained by a method wherein the nutrient-charged ion exchangers together with mineral fertilisers are coated with the massive polyurethanes having a particular water-absorbing capacity.

In this preferred embodiment of the mixtures according to the invention, the weight ratio coated solids (=sum of ion exchangers plus mineral fertilisers)/polyurethane is 1:0.5 to 1:6, preferably 1:0.8 to 1:3.

Coating of the mineral fertilisers with the massive polyurethanes having a particular water absorptivity adapted to the water solubility of the mineral fertiliser can be effected by processes which are in themselves known, for example by encapsulation or by embedding.

The invention furthermore relates to fertilisers for supplying plants with nutrient ions uniformly and over a long period of time, which contain mixtures of nutrient-charged synthetic resin ion exchangers and mineral fertilisers having a particle size <500 μm, wherein the mineral fertilisers are coated with massive polyurethanes having a particular water-abosrbing capacity (WA) which is adapted to the water solubility (WS) of the mineral fertiliser in the following manner:

for mineral fertilisers of a WS (20° C.) <3 g/l polyurethanes of a WA 25–60 g of water/100 g of polyurethane are used; for mineral fertilisers of a WS (20° C.) >3 g/l polyurethanes of a WA 0.5–30 g of water/100 g of polyurethane are used.

Preferred fertilisers are those which contain mixtures which have been produced by a method wherein nutrient-charged synthetic resin ion exchangers together with mineral fertilisers were coated with the massive polyurethanes having a particular water-absorbing capacity. The amount of mineral fertiliser in the fertilisers according to the invention is 25–300 equivalent %, preferably 75–150 equivalent %, relative to the sum of acidic and basic groups of the nutrient-charged synthetic resin ion exchangers present in the mixture.

In the fertilisers according to the invention, which have been produced by a method wherein nutrient-charged synthetic resin ion exchangers together with mineral fertilisers were coated with the massive polyurethanes having a particular water-absorbing capacity, the weight ratio ion exchanger+mineral fertilisers/polyurethane is 1:0.5 to 1:6, preferably 1:0.8 to 103.

Synthetic resin ion exchangers charged with plant nutrients are known; they are described, for example, in U.S. Pat. No. 3,082,074, in German Patent Specification No. 2,338,182 and in E. J. Hewitt, Loc. cit., page 61 et seq.

The synthetic resin ion exchangers can be microporous or macroporous, and can be polymerisation or condensation resins. Synthetic resin ion exchangers which can be used in the fertiliser combinations according to the invention are known weakly basic, moderately basic and strongly basic anion exchanger resins possessing primary, secondary and/or tertiary amino groups and/or quaternary ammonium, sulphonium or phosphonium groups, the weakly acidic, moderately acidic and strongly acidic cation exchanger resins possessing phenolic hydroxyl groups, carboxylic acid groups, phosphinic acid groups, phosphonic acid groups and/or sulphonic acid groups, and the chelate resins which form chelate complexes and contain, for example, aminocarboxylic acid groups or aminophosphonic acid groups.

Ion exchangers of the stated type are known. They and their preparation are described in, for example, F. Helfferich, Ion Exchange, Loc. cit. pages 26 to 71, and Ullmanns Enzyklopädie der technischen Chemie (Ullmann's Encyclopaedia of Industrial Chemistry), 4th edition, Volume 13, 1977, pages 295 to 309. Chelate resins with aminophosphonic acid groups, and their preparation, are described in, for example, British Patent Specification No. 859,834.

The ion exchangers are charged with nutrients by known methods, for example by the methods described in U.S. Pat. Specification No. 3,082,074, German Pat. No. 2,338,182 or German Offenlegungsschrift No. 3,020,422.

Mixtures of anion exchangers charged with nutrient anions and cation exchangers charged with nutrient cations are preferably used as nutrient-charged ion exchangers. In the ion exchanger mixtures, the ratio charged anion exchanger/charged cation exchanger is advantageously chosen such that the amount of acidic groups is 10 to 90%, preferably 10 to 50%, relative to the sum of the acidic and basic groups of the mixture.

The polyurethanes to be used according to the invention for coating the mineral fertilisers and which have a particular water-absorbing capacity adapted to the water solubility of the mineral fertiliser are prepared in a manner which is in itself known, by reacting di- and/or polyisocyanates with relatively high molecular weight compounds having at least two groups which are reactive towards isocyanates, and, if appropriate, low molecular weight chain-lengthening compounds or crosslinking agents, whereby the structure of the relatively high molecular weight compound, and where relevant, the amount of the cross-linking agent, depend on the water solubility of the salt to be coated.

Within the scope of the invention, massive polyurethanes are understood as meaning solid polyurethanes which do not possess a cell structure, and are neither gels nor capable of forming these.

Suitable starting components in the preparation of the polyurethanes are aliphatic, cycloaliphatic, araliphatic, aromatic and heterocyclic polyisocyanates, as described, for example, by W. Siefken in Liebig's Annalen der Chemie, Volume 562, pages 75 to 136.

Preferred polyisocyanates are in general the various toluylene diisocyanates and polymethylenepolyphenyl polyisocyanates, and mixtures of the two isocyanate types.

Among the polymethylenepolyphenyl polyisocyanates, those types are preferred which contain at least 80 percent by weight of diisocyanatodiphenylmethane, the remainder of this polyisocyanate consisting of closely related polyisocyanates of relatively high molecular weight and relatively high functionality.

This polyisocyanate type therefore includes (a) polymethylenepolyphenyl polyisocyanates which have a content of diisocyanatodiphenylmethane within the above range, and which are derived by phosgenation of polyamine mixtures obtained by acidic condensation of aniline and formaldehyde; and (b) polyisocyanates which have a content of diisocyanatodiphenylmethane within the above range and are obtained by chemical modification of diisocyanatodiphenylmethane itself, and which are referred to here as "modified" diisocyanatodiphenylmethanes.

The modified diisocyanatodiphenylmethanes include diisocyanatodiphenylmethane, that is to say both the 4,4'-isomer and mixtures of the 4,4'-isomer and the 2,4'-isomer and/or 2,2'-isomer, which have been treated to convert a minor proportion, usually less than 25% by weight of the starting material, to a synthetic modification of this starting material. For example, the polymethylenepolyphenyl polyisocyanate can be a diisocyanatodiphenylmethane which has been converted to a stable liquid at temperatures of about 20° C., in accordance with German Offenlegungsschrift No. 1,61b,380.

Starting components for the preparation of the polyurethanes are, furthermore, compounds which have at least two hydrogen atoms reactive towards isocyanates and possess a molecular weight of, as a rule, 400–10,000. In addition to compounds possessing amino groups, thiol groups or carboxyl groups, these are understood as meaning, preferably, polyhydroxy compounds, in particular compounds possessing two to eight hydroxyl groups, especially those of molecular weight 800–10,000, preferably 1,000 to 6,000, for example polyethers possessing at least two, as a rule 2 to 8, preferably, however, 2 to 4, hydroxyl groups.

Other starting components which may be used for the polyurethanes are compounds which have at least two hydrogen atoms reactive towards isocyanates and possess a molecular weight of 62–400. In this case, too, these are understood as meaning compounds which possess hydroxyl groups and/or amino groups and serve as chain-lengthening agents or crosslinking agents. These compounds possess as a rule 2 to 8 hydrogen atoms which are reactive towards isocyanates, preferably 2 or 3 reactive hydrogen atoms.

The following may be mentioned as examples of compounds of this type: ethylene glycol, propylene 1,2-glycol and 1,3-glycol, butylene 1,4-glycol and 2,3-glycol, pentane-1,5-diol, hexane-1,6-diol, octane-1,8-diol, neopentylglycol, 1,4-bis-hydroxymethylcyclohexane, 2-methyl-propane-1,3-diol, glycerol, trimethylolpropane, hexane-1,2,6-triol, trimethylolethane, pentaerythritol, quinitol, mannitol and sorbitol, diethylene glycol, triethylene glycol, dipropylene glycol and ethanolamine.

To prepare the polyurethanes which have a water-absorbing capacity (WA) of 25 to 60 g of water/100 g of polyurethane, polyethers are used which contain 25 to 60% by weight, relative to the weight of the polyether, of ethylene oxide groups. these polyethers can, if appropriate, be crosslinked. The amount of crosslinking agent can be up to 7% by weight, relative to the weight of the polyether.

To prepare the polyurethanes which have a water-absorbing capacity (WA) of 0.5 to 30 g of water/100 g of polyurethane, polyethers are used which contain 0 to 30% by weight, relative to the weight of the polyether, of ethylene oxide groups. These polyethers can, if appropriate, be crosslinked. The amount of crosslinking agent can be up to 10% by weight, relative to the weight of the polyether.

In the process according to the invention, or in the fertilisers according to the invention, the monovalent macronutrient ions, such as nitrate, dihydrogen phosphate, ammonium and potassium ions are preferably bound to the synthetic resin ion exchangers, while the divalent and higher-valent macronutrient ions, such as calcium, magnesium, sulphate and phosphate ions, are preferably present in the mineral fertilisers coated with massive polyurethanes. Micronutrients, such as iron, manganese, copper, zinc or cobalt, can be bonded, as cations, to cation exchange resins, or can be bonded, as anionic chelate complexes, to anion exchange resins, or can be present in the polyurethane-coated mineral fertilisers. Preferably, they are bonded, as anionic chelate complexes, to anion exchangers. Micronutrients, such as molybdenum and boron, are preferably bonded, as molybdate and borate, respectively, to anion exchange resins, or are present in the polyurethane-coated mineral fertiliser.

Suitable mineral fertilisers which can be coated with massive polyurethanes having a particular water-absorbing capacity are all natural and artificial (synthetic) fertilisers containing macro- and/or micronutrients, in particular calcium fertilisers, magnesium fertilisers, sulphate fertilisers and phosphate fertilisers. These can be single-nutrient or compound fertilisers, which can be employed individually or as a mixture. The following fertilisers may be mentioned as examples: calcium carbonate, dolomite, calcium sulphate, calcium nitrate, calcium phosphate, potassium magnesium phosphate, magnesium phosphate, magnesium ammonium phosphate, potassium metaphosphate, magnesium carbonate, magnesium silicate, magnesium oxide, magnesium nitrate, magnesium sulphate, potassium sulphate, ammonium phosphate, ammonium sulphate and phosphates, carbonates, sulphates, oxides and silicates of the micronutrients iron, copper, manganese, cobalt and zinc, molybdenum oxide, ammonium molybdate, borax, calcium metaborate and magnesium metaborate and the various commercial forms of these fertilisers (see, for example, A. Finck, De,uml/u/ nger und Düngung (Fertilisers and Fertilisation), Verlag Chemie, Weinheim, 1979, Chapters 2 and 3). Preferred mineral fertilisers are calcium carbonate, dolomite, calcium sulphate, magnesium ammonium phosphate, magnesium sulphate and calcium phosphate.

Coating of the mineral fertilisers, or of the mineral fertilisers and the synthetic resin ion exchangers, with the special polyurethanes can be effected by the methods of encapsulation and embedding, which are in themselves known. Moreover, embedding of the salts can be effected by the thermoplastic process or the reactive process.

Among the preparation methods which are possible according to the invention and employ reactive mixtures, such as, for example, the casting process, spraying process or reactive injection moulding process, the casting process has proved particularly simple and economical. Using this method, the polyurethanes according to the invention can be prepared in a manner which is in itself known, both by the one-step process and by the prepolymer or semi-prepolymer process.

Among the process variants in the casting method, the one-step process is particularly preferred according to the invention. In this case, relatively high molecular weight polyols, mineral fertilisers and if appropriate ion exchangers, crosslinking agents and fillers and additives, and finally the catalyst, are mixed, and the isocyanate component is then mixed in.

Among the thermoplastic processes, a procedure which is preferred according to the invention comprises adding the mineral fertilisers directly during the preparation of the polyurethane, if appropriate as a mixture with one of the starting components, for example in a process according to German Offenlegungsschrift No. 2,302,564 (=U.S. Pat. No. 3,963,679), polyisocyanates and polyhydroxy compounds being reacted with one another continuously in a twin-screw extruder.

The fertilisers according to the invention can, in addition to the nutrient-bearing synthetic resin ion exchangers and the mineral fertilisers coated with the special polyurethanes, contain fillers and additives. The following may be mentioned as examples of additives: dyestuffs, solid surface-active substances, pH-stabilising compounds, plant protection agents and plant growthregulating substances. Inorganic fillers, such as titanium dioxide, quartz sand, kaolin, soot and micro-glass spheres, and organic fillers, such as powders based on polystyrene or polyvinyl chloride, may be mentioned as examples of fillers.

The fertilisers according to the invention are used according to the methods customary in agriculture and horticulture. For example, the fertilisers according to the invention, in the form of granules, can be mixed with the natural or synthetic substrate, or worked into the soil by digging or ploughing. In water cultures, the new fertilisers can also be used in other forms. Thus, they can be used equally successfully in the form of granules as in the form of a plate or plates, a film or films, a block or a bar in the various irrigation methods. For the care of ornamental plants in water culture, the granules can, for example, be mixed with the inert substrate or introduced in the free form into the water reservoir. Particularly easy to handle in the care of individual plants are small containers (so-called nutrient batteries) of plastic or bags of, for example, nonwoven fabric, into which the granules can be introduced. The fertilisers according to the invention can also be used in the form of underlay plates for the fertilisation of plants in individual pots, both in the care of water cultures and of pot plants in soil. The fact that the easily handled, shaped pieces can be readily replaced after the fertilising action of the underlay plates has been exhausted is a particular advantage of this method.

The amount in which the fertilisers according to the invention are employed can vary within substantial ranges. It depends essentially on the particular nutrient requirement of the plants. In general, the amounts used are between 0.001 and 0.1 $dm^3$ per $dm^3$ of culture medium, preferably between 0.002 and 0.05 $dm^3$ per $dm^3$ of culture medium, when granulated material is used, or—when shaped pieces are used—between 5 and 100 g per plant, preferably between 5 and 50 g per plant, relative to the amount of ion exchangers incorporated.

With the aid of the process according to the invention, or with the fertilisers according to the invention, plants are supplied safely and over a long period with mineral nutrients which are strongly fixed by ion exchangers, such as calcium, magnesium or sulphur, and at the same time all other essential macro- and micronutrients are made available over a long period of time via ion exchange resins, and the ion exchange resins, as a result of their buffer action, simultaneously have a stabilising effect on the nutrient concentrations and on the pH value of the nutrient solution. The new fertilisers thus ensure a particularly harmonious nutrient supply which is satisfactory for the plants.

By the combined use of nutrient-charged synthetic resin ion exchangers and mineral fertilisers coated with polyurethanes having a particular water-absorbing capacity is possible, for example even in nutrient solutions of water cultures where soft irrigation waters are used, to establish, in an economical manner and for a long period, nutrient concentrations corresponding to the requirement of the plants. Nutrient deficiency and excessive nutrient concentrations and their adverse effects on plant growth are safely avoided by this method. By using the fertilisers according to the invention, the disadvantages of the known fertilisation methods for the water culture of plants in soft irrigation waters are overcome.

The amount "equivalent %" used in the examples below for the mineral fertilisers relates to the total amount of acidic and basic groups in the ion exchanger fertiliser employed.

EXAMPLE 1

13.5 g of a commercially available ion exchanger fertiliser for water cultures (Lewatit HD 5), which contains all essential macro- and micronutrients, with the exception of calcium, magnesium and sulphur, bonded to an ion exchanger mixture consisting of a cation exchange resin and an anion exchange resin, and has a total content of acidic and basic groups of 53 millimols, are mixed with 9.3 g of granules of polyurethane-coated calcium sulphate.

WS of the $CaSO_4 . 2 H_2O$ at 20° C.: 2.036 $g/dm^3$;

Content of $CaSO_4 . 2 H_2O$ in the granules: 3.2 g=74.4 millimols of ($\frac{1}{2} Ca^{2+} + \frac{1}{2} SO_4^{2-}$)=140 equivalent %;

Weight ratio $CaSO_4$/polyurethane: 1:2.5;

WA of the polyurethane: 40 g/100 g of polyurethane.

The granules of polyurethane-coated calcium sulphate has been produced as follows:

51 parts of calcium sulphate, $CaSO_4 . 2 H_2O$ (particle size 0.5–50 μm), were dispersed in a mixture of 50 parts of polyether 1, which had been obtained by the addition of 80% by weight of propylene oxide and 20% by weight of ethylene oxide to trimethylolpropane and had a hydroxyl number of 36, and 20 parts of polyether 2, which had been obtained by the addition of 40% by weight of propylene oxide and 60% by weight of ethylene oxide to glycerol and had a hydroxyl number of 28. 4 parts of butane-1,4-diol and 0.08 part of dibutyl-tin dilaurate were mixed into this dispersion. 23.8 parts of tripropylene glycol-modified 4,4'-diisocyanatodiphenylmethane (MDI) (isocyanate content 23% by weight) were added to the mixture obtained, and were mixed in thoroughly. The reaction mixture was poured into a cylindrical mould (diameter: 12 cm), where it hardened in the course of 5 minutes. The material, after it had been released from the mould, was then granulated to a particle size of 1–5 mm.

To determine the release of nutrients, the resulting mixture of 13.5 g of ion exchanger fertiliser and 9.3 g of granules of polyurethane-coated calcium sulphate together with 600 $cm^3$ of completely demineralised water were introduced into a plastic can and left to stand at room temperature in order to simulate the conditions of the water culture of plants in individual vessels. The water phase was drawn off at intervals of 3–4 days, tested to determine its content of nitrate and replaced by fresh water. After the water had been drawn off 7 times, the amount of nitrate released was 848 mg, which corresponds to 41% of the amount present in the ion exchanger fertiliser.

(The investigation was limited to the release of nitrate because preliminary experiments had shown that the release of nitrate is the process which governs the long-term fertilising action of the ion exchanger fertiliser.)

With the resulting mixture of 13.5 g of ion exchanger fertiliser and 9.3 g of granules of polyurethane-coated calcium sulphate, the nutrient supply of a plant of up to 50 cm height is assured for about 5 months in a water culture even when soft water (calcium hardness 4° dH) is used.

If in the preparation of the polyurethane-coated calcium sulphate a weight ratio $CaSO_4$/polyurethane of 1:7.5 is set instead of the stated weight ratio $CaSO_4$/polyurethane, combination of this polyurethane-coated calcium sulphate with the ion exchanger fertiliser gives a fertiliser which is particularly suitable for supplying slowly growing plants in water culture. If, for example, a mixture of 13.5 g of the abovementioned ion exchanger fertiliser and 22.2 g of granules of this polyurethane-coated calcium sulphate is introduced into the water of a slowly growing plant (succulents, orchids), this plant is supplied with nutrients for a period of more than 6 months, even when soft irrigation water (calcium hardness 4° dH) is used.

EXAMPLES 2-5

13.5 g portions of the nutrient-charged ion exchanger fertiliser (Lewatit HD 5) described in Example 1, with a total content of acidic and basic groups of 53 millimols, are mixed with the amounts of granules 1 or 2 of polyurethane-coated calcium sulphate which are given in Table 1.

TABLE 1

| Contents of fertilisers | Example 2 | 3 | 4 | 5 |
|---|---|---|---|---|
| Ion exchanger fertiliser [g] | 13.5 | 13.5 | 13.5 | 13.5 |
| Granules 1 [g] | 9.3 | — | 4.65 | — |
| Granules 2 [g] | — | 9.3 | — | 4.65 |
| $CaSO_4.2 H_2O$ [g] | 3.2 | 3.2 | 1.6 | 1.6 |
| $CaSO_4$ [equivalent %] | 140 | 140 | 70 | 70 |

The granules 1 and 2 used were prepared from the components given in Table 2 in the amounts given in that table, by the procedure described in Example 1. The preparation of polyethers 1 and 2 is likewise described in Example 1.

TABLE 2

|  | Granules 1 | Granules 2 |
|---|---|---|
| Polyether 1 (g) | 55 | 52.5 |
| Polyether 2 (g) | 15 | 17.5 |
| $CaSO_4.2 H_2O$ (g) | 51 | 51 |
| Butane-1,4-diol (g) | 4 | 4 |
| Dibutyl-tin dilaurate (g) | 0.08 | 0.08 |
| Modified MDI (g) | 23.8 | 23.8 |
| $CaSO_4$/PUR | 1:2.5 | 1:2.5 |
| WA of the PUR (g/100 g) | 35 | 37 |

The fertilisers prepared in this manner and having various compositions and modes of action are used for supplying nutrients to plants with correspondingly different nutrient requirements. To characterise the release of nutrients from the fertilisers obtained, the release of nitrate in completely demineralised water as a function of time was investigated as described in Example 1. The results of the measurement, expressed as a percentage of the amount of nitrate present in the ion exchanger fertiliser, are evident from FIG. 1.

EXAMPLE 6

A commercially available small pack (nutrient battery) containing 11.5 g of the nutrient-charged ion exchanger fertiliser described in Example 1 and having a total content of acidic and basic groups of 45 millimols is introduced, together with a polyurethane disc 1, which contains 1.6 g of $CaSO_4. 2 H_2O$ (Ws at 20° C.: 2.036 g/dm$^3$), and a polyurethane disc 2, which contains 2.3 g of $MgSO_4. 7 H_2O$ (WS at 20° C.: 356 g/dm$^3$), into a vessel for the water culture of individual plants. The combination is sufficient to supply nutrients to a plant (*Ficus benjamina*) of 35 cm height for 6 months when irrigation water with a total hardness of 3° d is used.

The polyurethane discs 1 and 2 had been prepared by the procedure described in Example 1, using the substances given in Table 3.

The weights of the discs after they had been released from the mould are likewise listed in Table 3.

The polyether 3 used for the preparation of the polyurethane disc 2 had been prepared by an addition reaction of propylene oxide with sorbitol, and had a hydroxyl number of 42.

TABLE 3

| Polyurethane disc | 1 | 2 |
|---|---|---|
| Polyether 1 (g) | 45 | — |
| Polyether 2 (g) | 25 | — |
| Polyether 3 (g) | — | 70 |
| Butane-1,4-diol (g) | 4 | — |
| Dibutyl-tin dilaurate (g) | 0.08 | 0.2 |
| Modified MDI (g) | 23.6 | 9.6 |
| $CaSO_4.2 H_2O$ (g) | 25.3 | — |
| $MgSO_4.7 H_2O$ (g) | — | 41.7 |
| Mineral fertiliser (calculated as an anhydrous salt)/PUR | 1:5 | 1:5.2 |
| WA of the PUR (g/100 g) | 52 | 5 |
| Mineral fertiliser (equivalent %) | 83 | 83 |
| Weight of the disc (g) | 6.8 | 13.3 |

EXAMPLE 7

The same good long-term fertilising action as that obtained with the combination described in Example 6 is also achieved in the case of the combined use of a commercially available small pack containing 11.5 g (corresponding to 45 millimols of acidic and basic groups) of the nutrient-charged ion exchanger fertiliser with a polyurethane disc which contains 2.24 g of $CaSO_4. 2H_2O$ and 0.96 g of $Mg NH_4PO_4 . 6 H_2O$ (WS at 15° C.=0.06 g/dm$^3$).

The polyurethane disc is produced according to the procedure described in Example 1, using the substances listed below, and the material, after it has been released from the mould, is cut into discs. Weight of a disc:

| Polyether 1 | 50 g |
|---|---|
| Polyether 2 | 20 g |
| Butane-1,4-diol | 4 g |
| Dibutyl-tin dilaurate | 0.08 g |
| Modified MDI | 23.7 g |
| $CaSO_4.2 H_2O$ | 35.8 g |
| $MgNH_4PO_4.6 H_2O$ | 15.4 g |
| Mineral fertiliser (calculated as an anhydrous salt mixture)/PUR | 1:2.7 |
| WA of the PUR | 40 g/100 g |
| Mineral fertiliser (equivalent %) | 170 |

EXAMPLE 8

82 g of a commercially available ion exchanger fertiliser for plants in soil cultures (Lewaterr 80 ®) which contains all essential macro- and micronutrients, with the exception of calcium, magnesium and sulphur, bonded to an ion exchanger mixture consisting of a cation exchange resin and an anion exchange resin, and has a total content of acidic and basic groups of 311 meq, and 16 g of $CaSO_4. 2H_2O$=372 millimols of ($\frac{1}{2}Ca^{2+}+\frac{1}{2}SO_4^{2-}$)=120 equivalent %, are mixed thoroughly with 55 g of polyether 1 according to Example 1, 15 g of polyether 2 according to Example 1, 4 g of butane-1,4-diol, 0.08 g of dibutyl-tin dilaurate and 24 g of modified MDI according to Example 1. The reaction mixture is poured into a cylindrical mould (diameter 12 cm), and it hardens in the course of 5 minutes to give a hard-elastic material. It is cut into discs which are 2 mm thick and weigh 29 g. (Ratio solid/polyurethane in the disc 1:1; WA of the polyurethane: 35 g/100 g of polyurethane).

The fertiliser discs produced in this manner are used as underlay plates for pot plants which are watered with soft water having a low salt content. With the aid of these discs, healthy development of plants of normal size is assured for 3-6 months, even in the case of soft irrigation water with a low salt content.

If instead of the abovementioned amount of polyurethane or polyurethane-forming compounds 4 times this amount is employed for the preparation of the fertiliser discs, and the fertiliser discs, in which the ratio solid/polyurethane is then 1:4, are cut to a thickness of 4.9 mm, corresponding to a weight of 70.5 g, fertiliser discs are obtained which are particularly suitable for feeding slowly growing plants. A disc of this type ensures nutrient supply for more than 6 months in the case of a slowly growing plant in soil culture, even when soft irrigation water is used.

EXAMPLE 9

83.9 g of the commercially available ion exchanger fertiliser described in Example 8, dried in a heating cabinet, 11.4 of $CaSO_4.2H_2O$ and 6.9 g of $MgSO_4$ (containing 25% by weight of water of crystallisation) are dispersed in a mixture of 58 g of polyether 1 according to Example 1, 12 g of polyether 2 according to Example 1 and 4 g of butane-1,4-diol. First 0.08 g of dibutyl-tin dilaurate and then the modified 4,4′-diisocyanatodiphenylmethane (MDI) described in Example 1 are added to the dispersion, and the mixture is stirred thoroughly. The reaction mixture is hardened, as described in Example 8, to give a compact cylinder. This is cut into discs of 2 mm thickness (weight of disc: 29 g).

Each of the discs thus obtained contains 12.15 g of the stated commercially available ion exchanger fertiliser, 1.65 g of $CaSO_4.2H_2O$, 1.0 g of $MgSO_4$ (containing 25% by weight of water of crystallisation) and 14.2 g of polyurethane. The ratio anhydrous fertiliser/polyurethane is 1:1.

If the fertiliser discs produced in this manner are used as underlays for the pots of plants in soil cultures, nutrient supply to the plants is assured for 4 to 6 months, even when soft irrigation water with a low salt content is used.

EXAMPLE 10

A commercially available nutrient battery containing 13.5 g of the ion exchanger fertiliser described in Example 1 (total content of acidic and basic groups: 53 millimols) was introduced, together with a polyurethane plate 1 which contained 1.9 g of $CaSO_4.H_2O$, and a polyurethane plate 2 which contained 1 g of $MgSO_4.H_2O$, into the water reservoir of a commercially available water culture vessel for individual plants. A climbing green plant, Ficus pomila, was planted in the culture pot, which contained expanded clay as the plant substrate.

The vegetation experiment described below was carried out using a total of 3 of the Ficus pomila water cultures prepared in the above manner. A soft drinking water with a low salt content (total hardness: 1.4° dH; specific conductivity: 100 μS/cm at 20° C.) was used as irrigation water for the vegetation experiment. The duration of the experiment (culture period) was 4 months. After the experiment was complete, the plants were assessed from general horticultural points of view (quality, leaf colour and habit), and the additional growth (weight of the tendrils cut off) was determined. The following average values per plant were obtained:

General assessment: 1.25 (corresponds to a very good plant quality on a scale of values from 1 (best value) to 5)
Leaf colour: green to dark green
Growth: pronounced sprouting
Additional growth: 41 g (fresh weight)

That is to say, a very good culture result was achieved in the growth experiment, in spite of the fact that very soft irrigation water was used.

For the preparation of the polyurethane plates 1 and 2, the substances listed in Table 4 below were mixed in the sequence described in Example 1. The reaction mixture was poured out onto a non-adhesive (Teflon) underlay, and spread to form a 2 mm thick layer. After the layer had hardened, the resulting polyurethane plates were cut into pieces having the dimensions given in Table 4.

TABLE 4

| Polyurethane plates | | 1 | 2 |
|---|---|---|---|
| Polyether 1 | (g) | 52.5 | 70 |
| Polyether 2 | (g) | 17.5 | — |
| Butane-1,4-diol | (g) | 4 | 4 |
| Dibutyl-tin dilaurate | (g) | 0.08 | 0.08 |
| Modified MDI | (g) | 23.8 | 24.2 |
| $CaSO_4.2H_2O$ | (g) | 31 | — |
| $MgSO_4.H_2O$ | (g) | — | 31 |
| Mineral fertiliser (anhydrous salt)/PUR | | 1:4 | 1:3.6 |
| WA of the PUR | (g/100 g) | 37 | 5 |
| Weight per piece | (g) | 7.9 | 4.2 |
| Dimensions of the pieces | (cm) | 10 × 5 × 0.2 | 5 × 4 × 0.2 |

Content of $CaSO_4.2H_2O$ per PUR plate 1:1.9 g=44.2 millimols of ($\frac{1}{2}Ca^{++} + \frac{1}{2}SO_4^{--}$)

Content of $MgSO_4.H_2O$ per PUR plate 2:1.0 g=29.3 millimols of ($\frac{1}{2}Mg^{++} + \frac{1}{2}SO_4^{--}$)

Total amount of mineral fertiliser [equivalent %, relative to the total amount of acidic and basic groups in the ion exchanger fertiliser employed]:139.

EXAMPLE 11

60 g of the ion exchanger fertiliser for soil cultures which is described in Example 8 (total content of acidic and basic groups: 227 millimols), 21.6 g of granulated, polyurethane-coated calcium sulphate (polyurethane granules 1) and 12.2 g of granulated, polyurethane-coated magnesium sulphate (polyurethane granules 2) were scattered on the intermediate base of a commercially available flower box with a water reservoir (dimensions: 65×19×19 cm). 3 pot plants (pelargonium zonal hybrids of the "Rubin" variety) with their root balls were introduced into the flower box. The box was filled with a plant substrate consisting of a mixture of 4 parts of expanded clay and one part of rockwool.

The polyurethane granules (1) and (2) had been produced by the procedure described in Example 1, using the substances given in Table 5.

The vegetation experiment was carried out with a total of 4 of the flower boxes prepared in the manner described above. A soft drinking water with a low salt content (total hardness: 1.4° dH; specific conductivity: 100 μS/cm at 20° C.) was used as irrigation water. The duration of the experiment (culture period) was 4 months. In this period, an average yield of 26 umbrella per plant was obtained, and after the experiment was complete the average weight of shoots per plant was 204 g of fresh substance, that is to say a good culture result was achieved in the growth experiment, in spite of the fact that a very soft irrigation water was used.

TABLE 5

| Polyurethane granules | | 1 | 2 |
|---|---|---|---|
| Polyether 1 | (g) | 55 | 70 |
| Polyether 2 | (g) | 15 | — |
| Butane-1,4-diol | (g) | 4 | 4 |
| Dibutyl-tin dilaurate | (g) | 0.08 | 0.08 |
| Modified MDI | (g) | 23.8 | 24.18 |
| $CaSO_4.2H_2O$ | (g) | 51 | — |
| $MgSO_4$ (content of water of crystallization: 25%) | (g) | — | 51.5 |
| Mineral fertiliser (anhydrous salt)/PUR | | 1:2.5 | 1:2.5 |
| WA of the PUR | (g/100 g) | 35 | 5 |

Content of $CaSO_4.2H_2O$ in 21.6 g of granules (1): 7.4 g = 172 millimols of ($\frac{1}{2}Ca^{++} + \frac{1}{2}SO_4^{--}$)

Content of $MgSO_4$ (100%) in 12.2 g of granules (2): 3.15 g = 105 millimols of ($\frac{1}{2}Mg^{++} + \frac{1}{2}SO_4^{--}$)

Total amount of mineral fertiliser [equivalent %, relative to the total amount of acidic and basic groups in the ion exchanger fertiliser employed]: 122.

What is claimed is:

1. In the process for supplying plants with nutrients uniformly and over a long period of time by the addition of nutrient-charged synthetic resin ion exchangers and mineral fertilizers to the culture medium, the improvement comprising employing the nutrient-charged synthetic resin ion exchanger together with a mineral fertilizer which has a particle size <500 μm and has been coated with a massive polyurethane having a particular water absorbing capacity (WA) which is adapted to the water solubility (WS) of the mineral fertilizer in the following manner:

for a mineral fertilizer of a WS (20° C.)<3 g/l a polyurethane of a WA 25–60 g of water/100 g of polyurethane is used;

for a mineral fertilizer of a WS (20° C.)>3 g/l a polyurethane of a WA 0.5–30 g of water/100 g of polyurethane is used.

2. The process according to claim 1, wherein the water absorbing capacity (WA) of the massive polyurethanes to be used for coating the mineral fertilizer is adapted to the water solubility (WS) of the mineral fertilizer in the following manner:

for a mineral fertilizer of a WS (20°)<3 g/l a polyurethane of a WA 30–50 g of water/100 g of polyurethane is used;

for a mineral fertilizer of a WS (20° C.)>3 g/l a polyurethane of a WA 0.5–20 g of water/100 g of polyurethane is used.

3. The process according to claim 1, wherein the water absorbing capacity (WA) of the massive polyurethanes to be used for coating the mineral fertilizer is adapted to the water solubility (WS) of the mineral fertilizer in the following manner:

for a mineral fertilizer of a WS (20° C.)>3 g/l a polyurethane of a WA 35–45 g of water/100 g of polyurethane is used;

for a mineral fertilizer of a WS (20° C.)>3 g/l a polyurethane of a WA 0.5–15 g of water/100 g of polyurethane is used.

4. The process according to claim 1, wherein the mineral fertilizer is coated with massive polyurethane having a particular water absorbing capacity, in an amount such that the weight ratio mineral fertilizer/polyurethane is 1:9 to 1:0.25.

5. The process according to claim 1, wherein the mineral fertilizer is coated with the massive polyurethane having a particular water absorbing capacity, in an amount such that the weight ratio mineral fertilizer/polyurethane is 1:6 to 1:1.5.

6. The process according to claim 1, wherein the nutrient-charged synthetic resin ion exchanger and the mineral fertilizer coated with the polyurethane having a particular water absorbing capacity, are employed in a proportion such that the amount of mineral fertilizer is 25 to 300 equivalent %, relative to the sum of acidic and basic groups in the nutrient-charged synthetic resin ion exchanger.

7. The process according to claim 1, wherein nutrient-charged synthetic resin ion exchanger and the mineral fertilizer coated with the polyurethane having a particular water absorbing capacity, are employed in a proportion such that the amount of mineral fertilizer is 75 to 150 equivalent %, relative to the sum of acidic and basic groups in the nutrient-charged synthetic resin ion exchanger.

8. The process according to claim 1, wherein the nutrient-charged synthetic resin ion exchanger and the mineral fertilizer coated with the massive polyurethane having a particular water absorbing capacity, are employed in the form of a mixture which has been obtained by a method wherein the nutrient-charged ion exchanger together with the mineral fertilizer are coated with the massive polyurethane having the particular water absorbing capacity.

9. The process according to claim 1, for long-term and uniform feeding of plants in water cultures.

10. A fertilizer for supplying plants with nutrients uniformly and over a long period of time, comprising a mixture of a nutrient-charged synthetic resin ion exchanger and a mineral fertilizer having a particle size <500 μm, wherein the mineral fertilizer is coated with a massive polyurethane having a particular water absorbing (WA) which is adapted to the water solubility (WS) of the mineral fertilizer in the following manner:

for a mineral fertilizer of a WS (20° C.)<3 g/l a polyurethane of a WA 25–60 g of water/100 g of polyurethane is used;

for a mineral fertilizer of a WS (20° C.)>3 g/l a polyurethane of a WA 0.5–30 g of water/100 g of polyurethane is used.

11. The fertilizer according to claim 10, wherein the mixture has been prepared by coating the nutrient-charged synthetic resin ion exchanger together with the mineral fertilizer with the massive polyurethane having the particular water absorbing capacity.

12. The fertilizer according to claim 10, wherein the amount of mineral fertilizer is 25 to 300 equivalent %, relative to the sum of acidic and basic groups in the nutrient-charged synthetic resin ion exchanger present in the fertiliser.

13. The fertilizer according to claim 10, wherein the weight ratio coated solids/polyurethane is 1:0.5 to 1:6.

* * * * *